(12) United States Patent
Wang

(10) Patent No.: US 11,953,190 B2
(45) Date of Patent: Apr. 9, 2024

(54) OUTDOOR ELECTRICAL DEVICE, CONTROLLER AND MOUNTING METHOD

(71) Applicant: SIGNIFY HOLDING B.V., Eindhoven (NL)

(72) Inventor: Zhi Pei Wang, Shanghai (CN)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 17/917,227

(22) PCT Filed: Mar. 30, 2021

(86) PCT No.: PCT/EP2021/058309
§ 371 (c)(1),
(2) Date: Oct. 5, 2022

(87) PCT Pub. No.: WO2021/204597
PCT Pub. Date: Oct. 14, 2021

(65) Prior Publication Data
US 2023/0160566 A1 May 25, 2023

(30) Foreign Application Priority Data

Jun. 11, 2020 (EP) .................................... 20179427

(51) Int. Cl.
*F21V 23/06* (2006.01)
*F21S 8/08* (2006.01)
(Continued)

(52) U.S. Cl.
CPC .............. *F21V 23/06* (2013.01); *F21S 8/085* (2013.01); *F21V 23/0464* (2013.01); *F21V 31/005* (2013.01); *F21W 2131/103* (2013.01)

(58) Field of Classification Search
CPC .... F21V 23/06; F21V 23/0464; F21V 31/005; F21S 8/085; F21W 2131/103
See application file for complete search history.

(56) References Cited

U.S. PATENT DOCUMENTS 9,638,405 B2    5/2017   Hobson
10,068,468 B2 * 9/2018   John ...................... H05B 47/19
(Continued)

*Primary Examiner* — Tsion Tumebo

(57) ABSTRACT

A controller (100) for mounting onto a socket (20) of an outdoor device (10) is disclosed. The controller comprises an inner body (110) comprising a first bottom surface from which an annular arrangement of electrical connection pins (102) for engaging with said socket extends, said inner body further housing control circuitry (132) for said outdoor device, said control circuitry being electrically connected to at least some of said electrical connection pins; and an outer body (120) rotationally mounted around the inner body, the outer body comprising a further bottom surface (122) around the first bottom surface and an outer cover (105) extending from said further bottom plate covering the control circuitry, the further bottom surface carrying an annular compressible gasket (104) for providing a weatherproof seal between the further bottom surface and the socket by rotational displacement of the outer body relative to the inner body. Also disclosed is an outdoor electrical device (10) comprising such a controller (100) and method of mounting such a controller (100) onto an outdoor electrical device (100).

15 Claims, 9 Drawing Sheets

(51) Int. Cl.
*F21V 23/04* (2006.01)
*F21V 31/00* (2006.01)
*F21W 131/103* (2006.01)

(56) References Cited

U.S. PATENT DOCUMENTS

| | | |
|---|---|---|
| 10,344,952 B2 | 7/2019 | Georgiev |
| 10,555,400 B1 | 2/2020 | Jory |
| 11,482,821 B2 * | 10/2022 | Thijs ................. H01R 33/74 |
| 2013/0044444 A1 * | 2/2013 | Creighton ............ G01J 1/0271 |
| | | 361/752 |
| 2013/0210252 A1 * | 8/2013 | Ilyes ................... H01R 33/945 |
| | | 439/226 |
| 2015/0260377 A1 | 9/2015 | Hobson |
| 2018/0092186 A1 | 3/2018 | Stuby, Jr. |
| 2019/0186719 A1 * | 6/2019 | Mostoller ................ G01J 1/42 |

* cited by examiner (A)

(B)

(C)

OUTDOOR ELECTRICAL DEVICE, CONTROLLER AND MOUNTING METHOD

CROSS-REFERENCE TO PRIOR APPLICATIONS

This application is the U.S. National Phase application under 35 U.S.C. § 371 of International Application No. PCT/EP2021/058309, filed on Mar. 30, 2021, which claims the benefit of Chinese Patent Application No. PCT/CN2020/084299, filed on Apr. 10, 2020, and European Patent Application No. 20179427.8, filed on Jun. 11, 2020. These applications are hereby incorporated by reference herein.

FIELD OF THE INVENTION

The present invention relates to a controller for mounting onto a socket of an outdoor device, the controller comprising a body having a bottom surface from which an annular arrangement of electrical connection pins for engaging with said socket extends, said body further housing control circuitry for said outdoor device, said control circuitry being electrically connected to at least some of said electrical connection pins.

The present invention further relates to an outdoor electrical device comprising such a controller.

The present invention further relates to a method of mounting such a controller onto such an outdoor electrical device.

BACKGROUND OF THE INVENTION

The functionality of any outdoor electrical devices, for example outdoor luminaires such as street lamps, may be controlled using external controllers that can be mounted into a socket of the outdoor electrical device. Without such a controller, the outdoor electrical device may function in a default manner or may be non-functional (switched off), whereas the controller augments or implements the functionality of the outdoor electrical device. For example, a light sensor such as a daylight sensor may be added to such an outdoor electrical device in order to automatically switch on/off the device once the ambient light levels drop below or exceed a defined threshold value. This for instance may be used to automatically switch an outdoor luminaire on around dusk and/or switch it off around dawn. An example of such an arrangement is disclosed in U.S. Pat. No. 10,555,400 B1.

The installation of such external controllers onto outdoor electrical devices typically requires the mounting arrangement to be weatherproof, e.g. be compliant with an ingress protection (IP) rating of IP 66 or better, to ensure longevity of the installation and prevent its degradation by moisture ingress. To this end, the controller typically comprises a sealing ring at its bottom surface, which sealing ring mates with the surface of the socket of the outdoor electrical device into which the controller is mounted. Such sockets typically comprise an annular arrangement of slots for receiving an annular arrangement of electrical contact pins extending from the bottom surface of the controller, which slots contain electrically conductive clamps such that upon insertion of the electrical contact pins into the slots, the pins can be rotated into the clamps to secure the controller against the socket of the outdoor electrical device. A typical installation of a controller 100 onto an outdoor electrical device 10, here an outdoor luminaire, is schematically depicted in FIG. 1-4. During such an installation, the controller 100 is lowered onto the socket 20 in or on an external surface 12 of the outdoor electrical device 10, after removal of a cap (not shown) from the socket 20, to expose its annular arrangement of slots 22 in its surface 21. The insertion of the electrically conductive pins 102 into pin reception regions 24 of the slots 22 typically requires a downward force onto the controller, which downward force compresses the sealing ring (not visible in FIG. 1-4) against the socket surface 21 to establish the weatherproof seal around the electrical contacts, after which the controller 100 is twisted relative to the socket 20 as shown in FIG. 1 to slot its electrical connection pins 102 into the clamps 26 within the slots 22 of the socket 20, e.g. a clamp 26 for connecting an electrical conductive pin 102 to a live input, a clamp 26 for connecting an electrical conductive pin 102 to a live output and a clamp 26 for connecting an electrical conductive pin 102 to neutral such that the controller 100 can act as a switch between the live input and live output.

This may result in the controller 100 being electrically connected through conductive connections 16, e.g. wires, to a driver 14 or the like of a load such as one or more light sources or any other suitable electrical component within the outdoor electrical device 10, as depicted in FIG. 2, such that the controller 100 can control the driver 14 or the like, e.g. by enabling or disabling the power supply (L, N) to the driver 14 or the like.

The socket 20 may further comprise an alignment aid 28, e.g. a compass direction marker, to ensure the socket 20 is mounted in or on the surface 12 such that the controller 100 can be correctly installed onto the socket 20, e.g. in case of the controller 100 comprising a light sensor to ensure that the light sensor faces the correct compass direction, e.g. a northerly direction on the Northern hemisphere, to protect the light sensor from direct exposure to sunlight.

However, such an installation method is not without problems. Firstly, the rotation or twisting of the electrical connection pins into the electrically conductive clamps is cumbersome to the installer due to the fact that the sealing ring is already compressed against the socket surface, especially where the installation has to be performed at height, e.g. on top of a pole-mounted outdoor electrical device such as a luminaire.

Moreover, the socket 20 and controller 100 dimensionally may need to comply with certain standards, such as the ANSI C 136.10/136.41 or the BS 5972 UK standards in case of photo-electric control units for road lighting. Within such standards, tolerances are typically defined for the dimensions of the various components of such a controller/socket arrangement, such as for the electrically conductive pins 102 and the mating slots 22. As shown in FIG. 5, this means that the (annular) gasket or sealing ring 104 at the bottom surface 101 of the controller 100 must be dimensioned such that it can accommodate for any allowed dimension of the electrically conductive pins 102 and the mating slots 22 of the socket 20 within the defined tolerances. This means that both Ystep, which defines the height overlap between the gasket 104 and the top portion of the socket 20 and Ygap, which defines the height of the clearance between the top portion of the socket 20 and the bottom surface 101 of the controller 100 typically are subject to a relative large tolerance range.

This is far from ideal for a number of reasons. If Y (Ygap+Ystep) becomes too small, this means that the gasket material has to be compressed to a large extent during the installation, which makes installation of the controller 100 into the socket 20 difficult to achieve. On the other hand, if Y remains large in the installed assembly, the lack of compression means it may be difficult to achieve a weatherproof seal with the gasket 104 around the electrical connections. In addition, the total height Y of the gasket 104 may have to cover such a large working range that most compressible materials, e.g. silicon rubber or EPDM (ethylene propylene diene monomer) rubber, cannot be used for such gaskets 104 because these materials are not compressible enough. This limits the choice of suitable materials, and often sponge materials have to be used for such gaskets 104, which due to their porous nature can compromise the weatherproofing of the seal provided by the gasket 104. Furthermore, the required large working range for the gasket material can lead to an unacceptably high failure rate in the mass production of the controllers 100.

SUMMARY OF THE INVENTION

The present invention seeks to provide a controller for an outdoor electrical device that can be more easily and reliably installed onto the outdoor electrical device.

The present invention further seeks to provide an outdoor electrical device comprising such a controller.

The present invention further seeks to provide a method of mounting such a controller onto an outdoor electrical device.

According to an aspect, there is provided a controller for mounting onto a socket of an outdoor device, the controller comprising an inner body comprising a first bottom surface from which an annular arrangement of electrical connection pins for engaging with said socket extends, said inner body further housing control circuitry for said outdoor device, said control circuitry being electrically connected to at least some of said electrical connection pins; and an outer body rotationally mounted around the inner body, the outer body comprising a further bottom surface around the first bottom surface and an outer cover extending from said further bottom plate covering the control circuitry, the further bottom surface carrying an annular compressible gasket for providing a weatherproof seal between the further bottom surface and the socket by rotational displacement of the outer body relative to the inner body.

By providing a controller having an outer body rotationally mounted relative to an inner body, the required working range of the gasket for providing the weatherproof seal around the electrical contacts when the controller is mounted onto the outdoor electrical device is transferred onto the range of rotational displacement of the outer body relative to the inner body, thereby reducing the failure rate of the weatherproof seal between the controller and the socket of the outdoor electrical device. This also means that a larger range of materials may be used for the gasket, e.g. the gasket may be a sponge or rubber gasket such as a silicone or EPDM gasket, and it simplifies installation of the controller onto the outdoor electrical device due to the fact that during rotation of the electrical connection pins into the clamps of the socket of the outdoor electrical device, the gasket does not need to contact the upper surface of the socket, as this contact may be established after the electrical connection pins are secured into the clamps by rotation of the outer body around the secured inner body towards the socket surface until the gasket is compressed against this surface.

Preferably, the outer body is rotationally mounted around the inner body by engaged screw threads on the inner body and outer body respectively, said engaged screw threads exhibiting a friction exceeding a further friction to be overcome when rotating the electrical connection pins into a clamp arrangement within said socket. In other words, the force required to rotate the outer body relative to the inner body typically is higher than the force required to twist the electrically conductive pins of the controller into the socket clamps, such that an installer can twist the inner body and outer body of the controller as a single unit into the socket before the outer body is twisted relative to the inner body to lower the gasket onto the socket. This makes installation of the controller onto the outdoor electrical device particularly straightforward.

The controller may further comprise an inner cover mounted on the inner body covering the control circuitry and a snap fitting between the inner cover and the outer cover for introducing said friction between the inner body and the outer body. Such a snap fitting is a particularly suitable arrangement for introducing such friction.

The said snap fitting may comprise a plurality of serrated regions on one of an inner surface of the outer cover and the outer surface of the inner cover for engaging with respective protrusions on the other of the inner surface of the outer cover and the outer surface of the inner cover. Such serrated regions may be dimensioned in accordance with the desired working range of the rotation of the outer body relative to the inner body, such that over-twisting of the outer body relative to the inner body may be effectively prevented.

The control circuitry in particular embodiments comprises a light sensor to facilitate photo-electric control of the outdoor electrical device.

In such embodiments, the outer cover may be transparent, and the inner cover may comprise at least a light transmissive region in a sidewall of the inner cover. This has the advantage that the weatherproofing of the light transmissive region, e.g. an opening, a transparent window or the like, is provided by the outer cover, thereby obviating the need for complex manufacturing techniques to establish such weatherproofing between the light transmissive region and the sidewall of the inner cover, e.g. in case of the transparent region taking the form of an insert into this sidewall. In fact, the light transmissive region may not have to be embodied by a transmissive material, but instead may simply be an opening (window) into the sidewall, with this opening being covered by the transparent outer cover.

The inner cover may be an opaque cover including said light transmissive region in said sidewall. This has the advantage that the light sensor is mainly sensitive to light coming from a particular direction, i.e. a direction facing the light transmissive region, which may be desirable for photo-electric control as previously explained.

The inner cover may further comprise an alignment marker in alignment with said transparent region on a top surface of the inner cover to assist an installer of the controller in correctly positioning the controller onto the outdoor electrical device, e.g. by ensuring that the light transmissive region faces the appropriate compass direction such as a northerly direction in order to safeguard correct operation of the controller.

The control circuitry may be mounted on the inner body in any suitable manner. In a particular embodiment, the controller further comprises a printed circuit board affixed to the inner body and carrying the control circuitry. This makes the mounting of the control circuitry onto the inner body particularly straightforward. In some embodiments, the controller is ANSI 136.10/136.41 or BS5972 compliant, i.e. the dimensions of the various components of the controller specified in these standards comply with the mandated dimensions in these standards. This for instance may be appropriate where the controller is a photo-electric control unit for a street lamp. However, the controller does not necessarily comply with these specific standards, for instance where the controller is used in other outdoor applications.

According to another aspect, there is provided an outdoor electrical device comprising the controller of any of the herein described embodiments and a socket having an annular arrangement of slots, each slot having a pin reception region and an electrically conductive clamp that is rotationally offset relative to said pin reception region, wherein the controller is mounted in said socket such that each of said electrical connection pins is secured in one of said electrically conductive clamps, and the outer body of the controller is engaged with the socket such that the annular compressible gasket forms a weatherproof seal between the outer body and the socket. Such an outdoor electrical device benefits from the presence of the controller according to embodiments of the present invention in that a more reliable weatherproof seal between the controller and the socket of the outdoor electrical device is provided owing to the establishment of this seal after the controller pins are secured in the socket clamps by twisting or rotation of the outer body of the controller relative to its inner body as explained above.

In particular embodiments, the outdoor electrical device is an outdoor luminaire comprising a driver electrically coupled to the electrically conductive clamps and a light source under control of the driver, wherein the controller is arranged to control the driver, e.g. a photo-electrical controller using a light sensor. This is particularly advantageous because the installation of the controller on such luminaires has become more straightforward, which is particularly applicable where the luminaire is installed at some height, e.g. on a pole such as in the case of street lighting or the like.

According to yet another aspect, there is provided a method of mounting the controller of any of the herein described embodiments onto an outdoor electrical device comprising a socket having an annular arrangement of slots, each slot having a pin reception region and an electrically conductive clamp that is rotationally offset relative to said pin reception region, the method comprising positioning the outer body of the controller in an initial orientation relative to the inner body of the controller, wherein in said initial orientation the further bottom surface is vertically displaced relative to the first bottom surface to such an extent that the annular compressible gasket does not touch the socket upon engagement of the controller with the socket; and engaging the controller with the socket by slotting the electrically conductive pins of the controller into the annular arrangement of slots; twisting the controller relative to the socket to slot the electrically conductive pins into the electrically conductive clamps whilst maintaining said initial orientation between the inner body and the outer body; and rotating the outer body relative to the inner body towards the socket to establish a weatherproof seal between the outer body and the socket by compressing the annular compressible gasket against said socket.

Such a mounting method has the advantage that the annular compressible gasket does not have to physically contact the socket when twisting the electrically conductive pins of the controller into the socket clamps, which makes this twisting operation easier to achieve and does not risk damage to the annular compressible gasket during this twisting operation. Instead, the weatherproof seal between the controller and the socket is achieved by subsequently rotating the outer body relative to the inner body.

Preferably, twisting the controller relative to the socket to slot the electrically conductive pins into the electrically conductive clamps whilst maintaining said initial orientation requires a first twisting force and rotating the outer body relative to the inner body towards the socket to establish a weatherproof seal between the outer body and the socket by compressing the annular compressible gasket against said socket requires a second twisting force exceeding the first twisting force such that the inner body and outer body maintain their initial orientation relative to each other, i.e. act as a single unit, when twisting the twisting the electrically conductive pins of the controller into the socket clamps, thereby achieving a particularly straightforward securing of the controller pins into the socket clamps.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
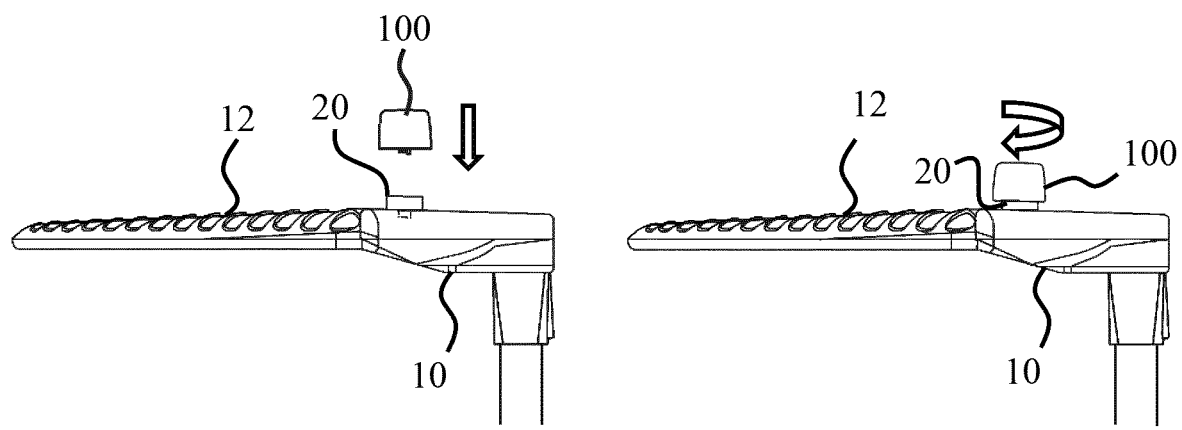
FIG. 1 schematically depicts a process of mounting a controller onto an example outdoor electrical device.
Figure 2:
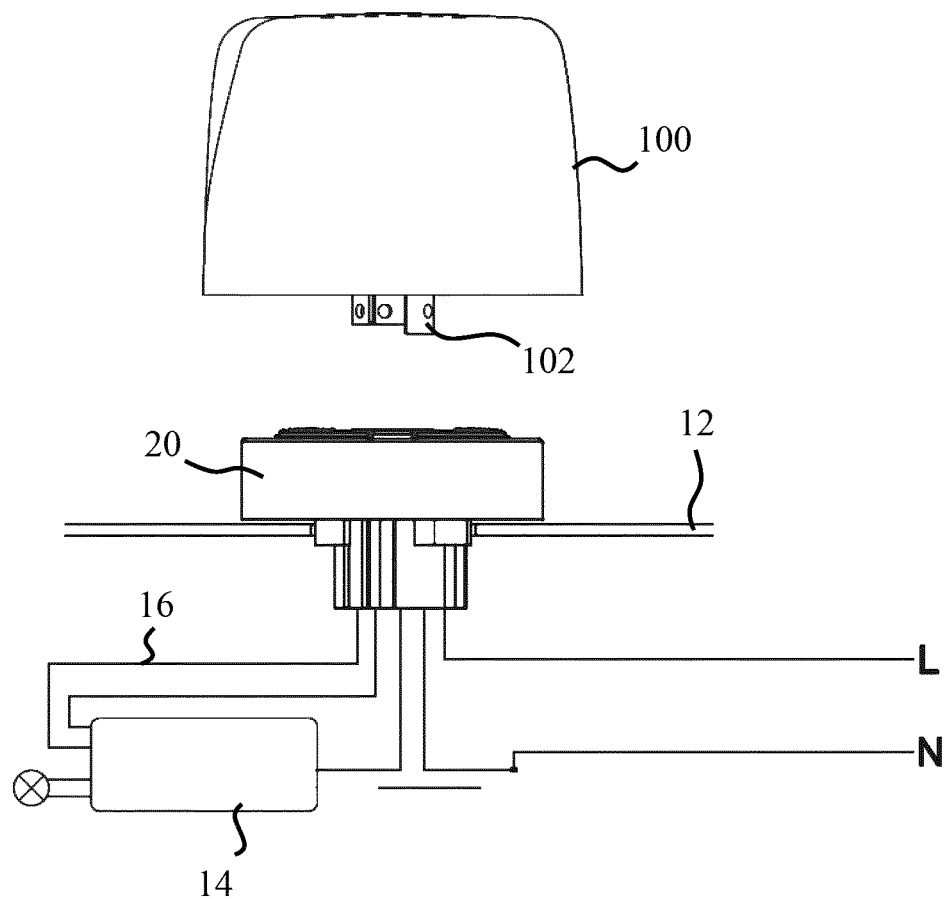
FIG. 2 schematically depicts an example connectivity of a controller when mounting onto an outdoor electrical device.
Figure 3:
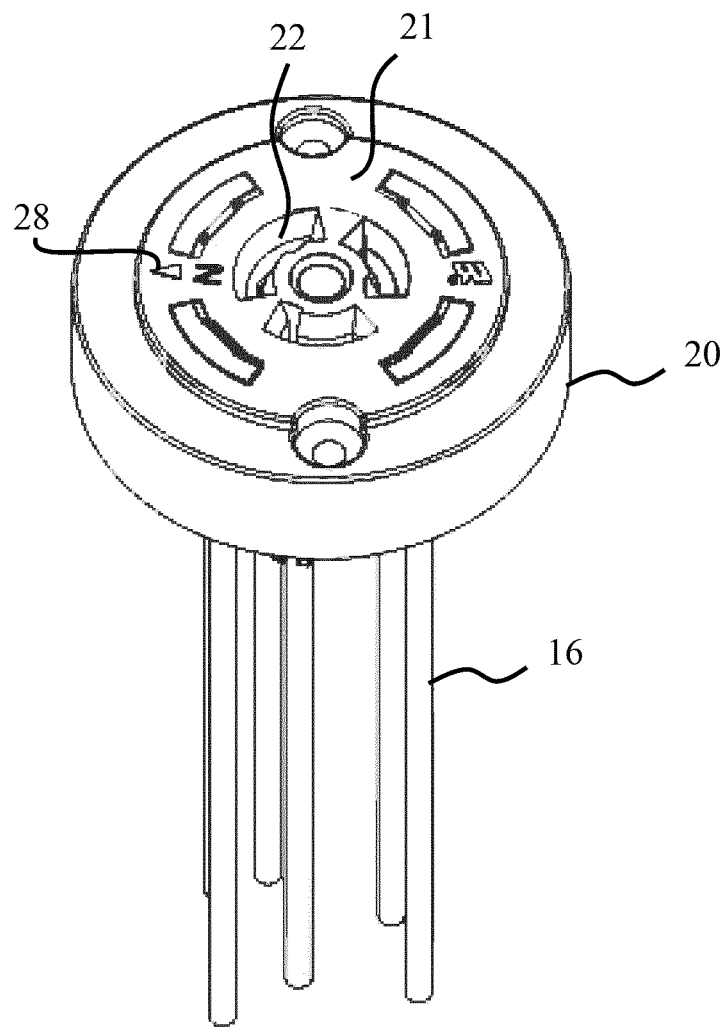
FIG. 3 schematically depicts a socket and attached electrical connections of such an example outdoor electrical device.
Figure 4:
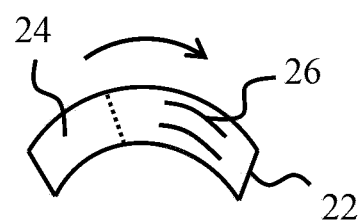
FIG. 4 schematically depicts an aspect of such a socket.
Figure 5:
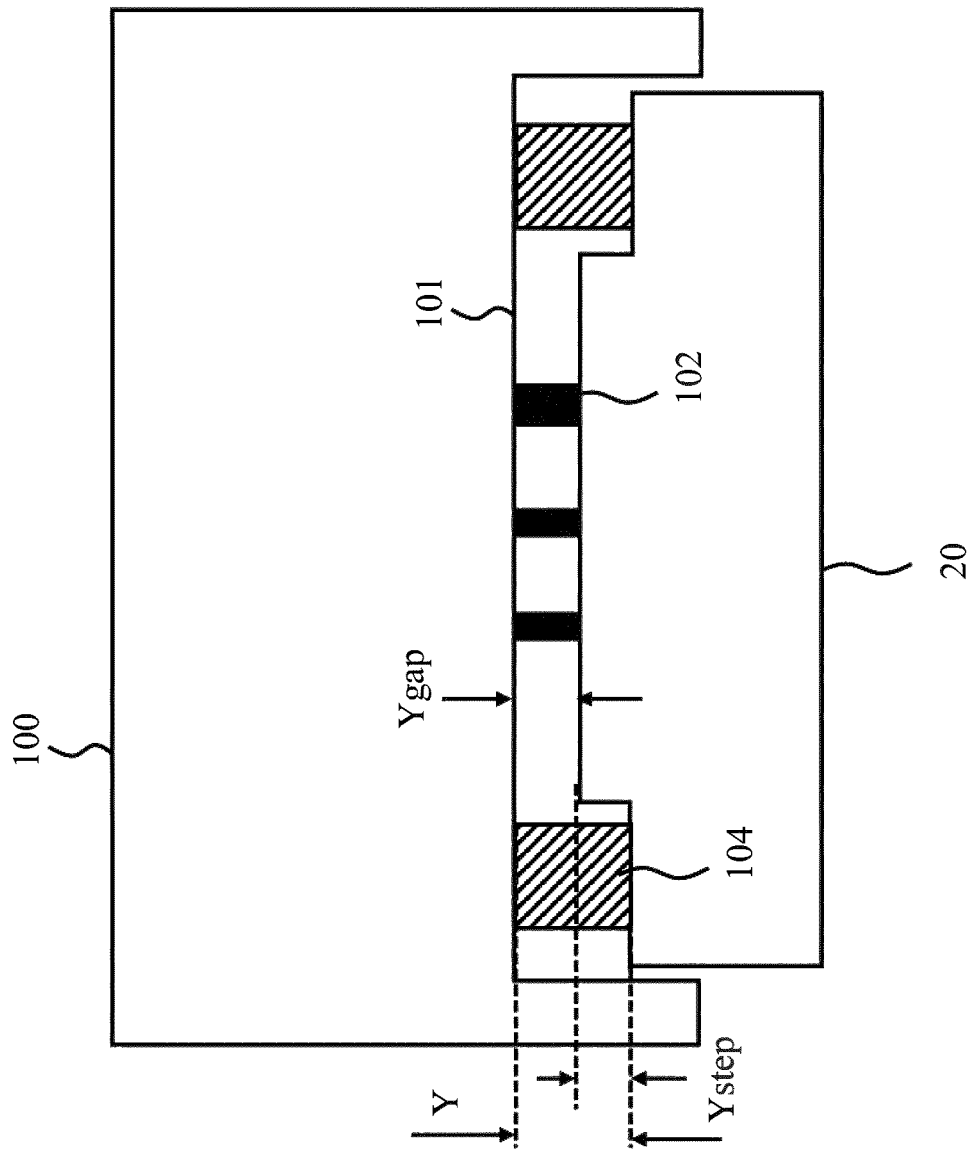
FIG. 5 schematically depicts a controller mounted onto such a socket and typical dimensions applicable to the annular compressible gasket of such a controller.

It should be understood that the Figures are merely schematic and are not drawn to scale. It should also be understood that the same reference numerals are used throughout the Figures to indicate the same or similar parts.

Figure 6:
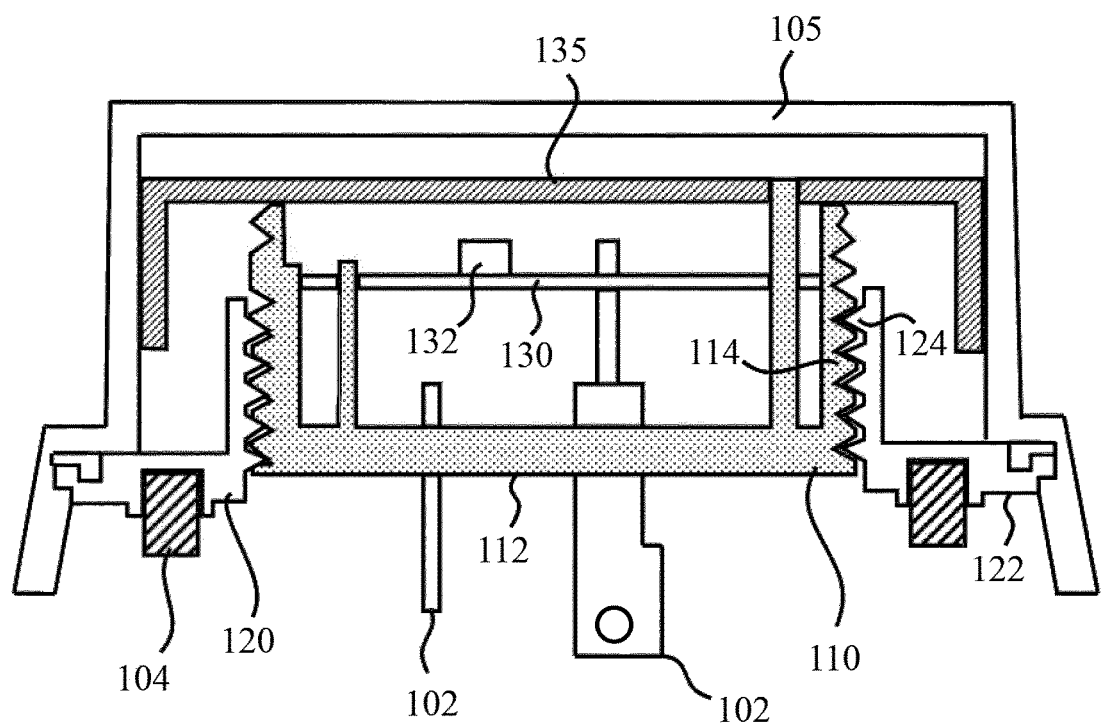
FIG. 6 schematically depicts a cross-sectional view of a controller according to an example embodiment.

FIG. 6 schematically depicts a controller 100 according to example embodiments. The controller 100 comprises an inner body 110 and an outer body 120. The outer body 120 is rotationally mounted onto the inner body 110, for example by the screw thread 114 on the inner body 110 engaging with the screw thread 124 on the outer body 120, such that the outer body 120 can be rotationally displaced relative to the inner body 110 as will be explained in further detail below. The inner body 110 comprises the annular arrangement of electrically conductive pins 102, which pins extend from a bottom surface 112 of the inner body 110. The electrically conductive pins 102 may be made of any suitable electrically conductive material, e.g. copper, steel or the like. The controller 100 may comprise at least three electrically conductive pins 102, e.g. a pin for connecting the controller to a live input, a pin for providing a live output and a neutral pin in case of the controller 100 being connected to an alternating current source. The controller 100 may act as a switch between the live input and the live output as previously explained.

At least some of the electrically conductive pins 102 are electrically connected to the control circuitry 132 for the outdoor electrical device 10, which control circuitry 132 may be mounted onto the inner body 110 in any suitable manner. In an example embodiment, the control circuitry 132 is mounted onto a printed circuit board (PCB) 130, which PCB may be secured against the inner body 110 in any suitable manner, e.g. using screws or the like. The control circuitry 132 may take any suitable form. In an example embodiment, the control circuitry 132 comprises a light sensor, such as a photodiode, photo cell or the like such that the controller 100 can provide photo-electric control of an outdoor electrical device 10 such as a luminaire, e.g. a street map or the like, when the controller 100 is mounted thereon.

The outer body 120 carries the annular compressible gasket 104 on its bottom surface 122, i.e. the surface facing the socket 20 when the controller 100 is mounted on the outdoor electrical device 10. As the required compression factor for the annular compressible gasket 104 has been minimized owing to the fact that the outer body 120 can be rotated towards the socket 20 relative to the inner body 110 once the electrically conductive pins 102 are secured within the clamps 26 of the socket 20, the annular compressible gasket 104 may be made of a wide range of compressible materials including rubber materials such as silicone rubbers and EPDM rubbers, and sponge materials. The outer body 120 further carries an outer cover 105 that acts as the housing of the electrical components within the controller 100. The inner body 110 may carry an inner cover 135 arranged to shield the control circuitry 132. For example, the inner cover 135 may be a PCB cover in case the control circuitry 132 is mounted onto the PCB 130. The inner cover 135 and the outer cover 105 may each be made of any suitable material or combination of materials. Preferably, the inner cover 135 and the outer cover 105 are each made of an electrically insulating material such as any suitable electrically insulator polymer or polymer blend. Other suitable materials will be immediately apparent to the skilled person.

Figure 7:
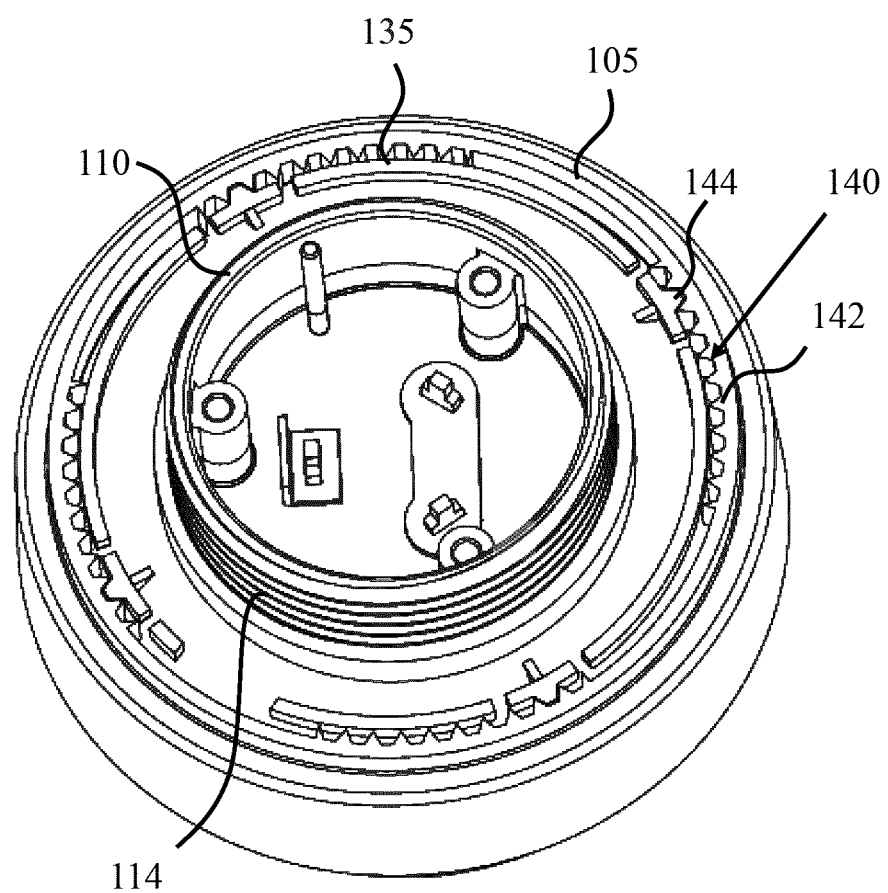
FIG. 7 schematically depicts a cross-sectional view of an aspect of such a controller according to an example embodiment.

In a preferred embodiment, the inner cover 135 and the outer cover 105 are mechanically coupled to each other by means of a snap fit that introduces a friction between the inner body 110 and the outer body 120, such that rotation of the outer body 120 relative to the inner body 110 requires this friction to be overcome. This is schematically shown in FIG. 7 depicting a cross-sectional view of the controller 100 along a horizontal plane, in which the snap fit 140 between the inner cover 135 and the outer cover 105 is realized by way of non-limiting example by means of a plurality of serrated regions 142 on the inner surface of the outer cover 105, with each of the serrated regions 142 engaging with a suitably shaped protrusion 144 on the outer surface of the inner cover 135. The serrated regions 142 may comprise stops at a region boundary to prevent over-rotation of the outer body 120 relative to the inner body 110 by preventing the twisting of the serrated regions beyond the protrusion 144 on the outer surface of the inner cover 135. Of course, it is equally feasible for the serrated regions 142 to be located on the outer surface of the inner cover 135 and the matching protrusion 144 to be located on the inner surface of the outer cover 105.

Figure 8:
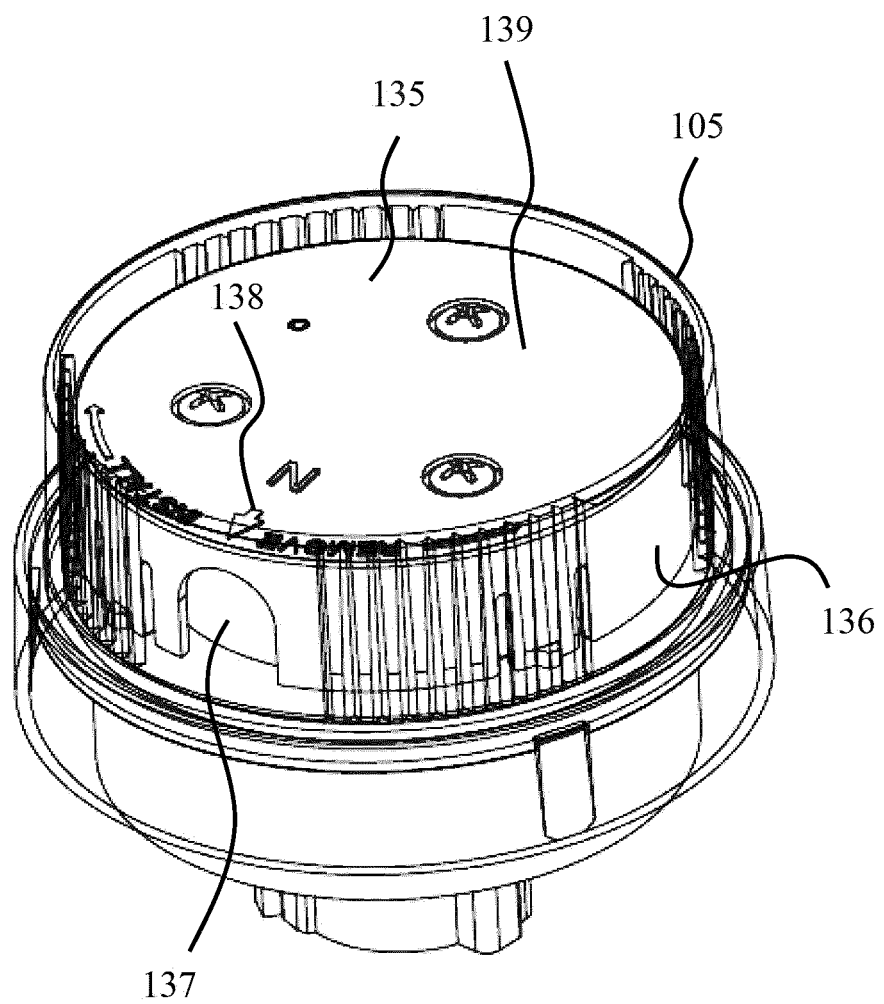
FIG. 8 schematically depicts a axonometric view of another aspect of such a controller according to an example embodiment.

In embodiments in which the control circuitry 132 comprises a light sensor, the outer cover 105 may be transparent such that light can travel through the outer cover 105 and reach the light sensor. Otherwise, the outer cover 105 may have any suitable optical transmittance, e.g. may be translucent or opaque instead. Where the control circuitry 132 comprises a light sensor, the inner cover 135 may be made of an opaque material comprising a light transmissive, e.g. transparent region in a sidewall of the inner cover 135 formed by a transparent material or an opening in the sidewall. An example embodiment of such a controller 100 is schematically depicted in FIG. 8, in which an opening 137 acting as a light transmissive region is created in a sidewall 136 of an opaque inner cover 135, such that light can only reach the light sensor through the opening 136 and the transparent outer cover 105 from a particular direction. For example, where the controller 100 is to implement photo-electric control of an outdoor electrical device 10, the light sensor may need to be protected from direct sunlight, e.g. to prevent damage to the light sensor, such that the opening 137 should be north-facing when installing on the Northern hemisphere (or south-facing when installing on the Southern hemisphere). An alignment marker 138 in alignment with the opening 137 may be present on a top surface 139 of the inner cover 135 for this purpose, such that the installer can correctly position the controller 100 onto the outdoor electrical device 10 to ensure that the opening 137 is indeed facing in the desired compass direction, e.g. north-facing.

The outer cover 105 further protects the inner cover 135 from erosion by exposure to outdoor conditions, such that the alignment marker 138 remains visible over time whilst the controller 100 is exposed to such conditions. In a further embodiment, the inner cover 135 may be colour-coded in order to allow identification of the appropriate application domain, e.g. the appropriate voltage rating and/or operating voltage, failure mode (fail-on, fail-off) and so on, of the controller 100. For instance, in certain standards the caps on the socket 20 are colour-coded to identify the voltage rating, operating voltage and failure mode of the outdoor electrical device 10. The same colour coding may be used for the inner cover 135 such that an installer can immediately recognize whether the controller 100 is intended for use with the outdoor electrical device 10, thereby minimizing the risk of an incorrect controller 100 being installed onto such an outdoor electrical device 10.

Figure 9A:
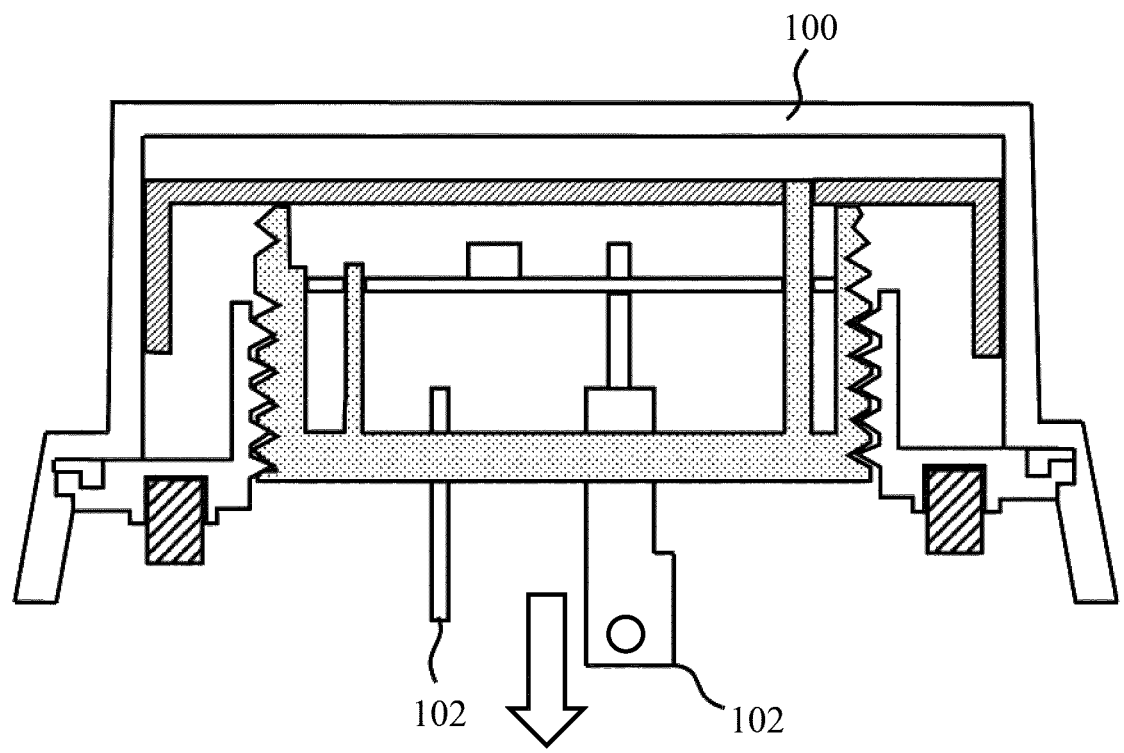
FIG. 9A-9C schematically depicts a method of mounting such a controller onto an outdoor electrical device according to an example embodiment.
Figure 9A:
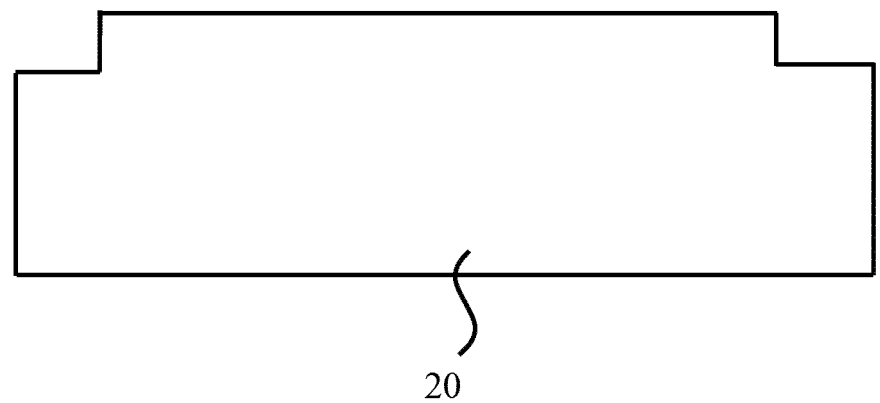
Figure 9B:
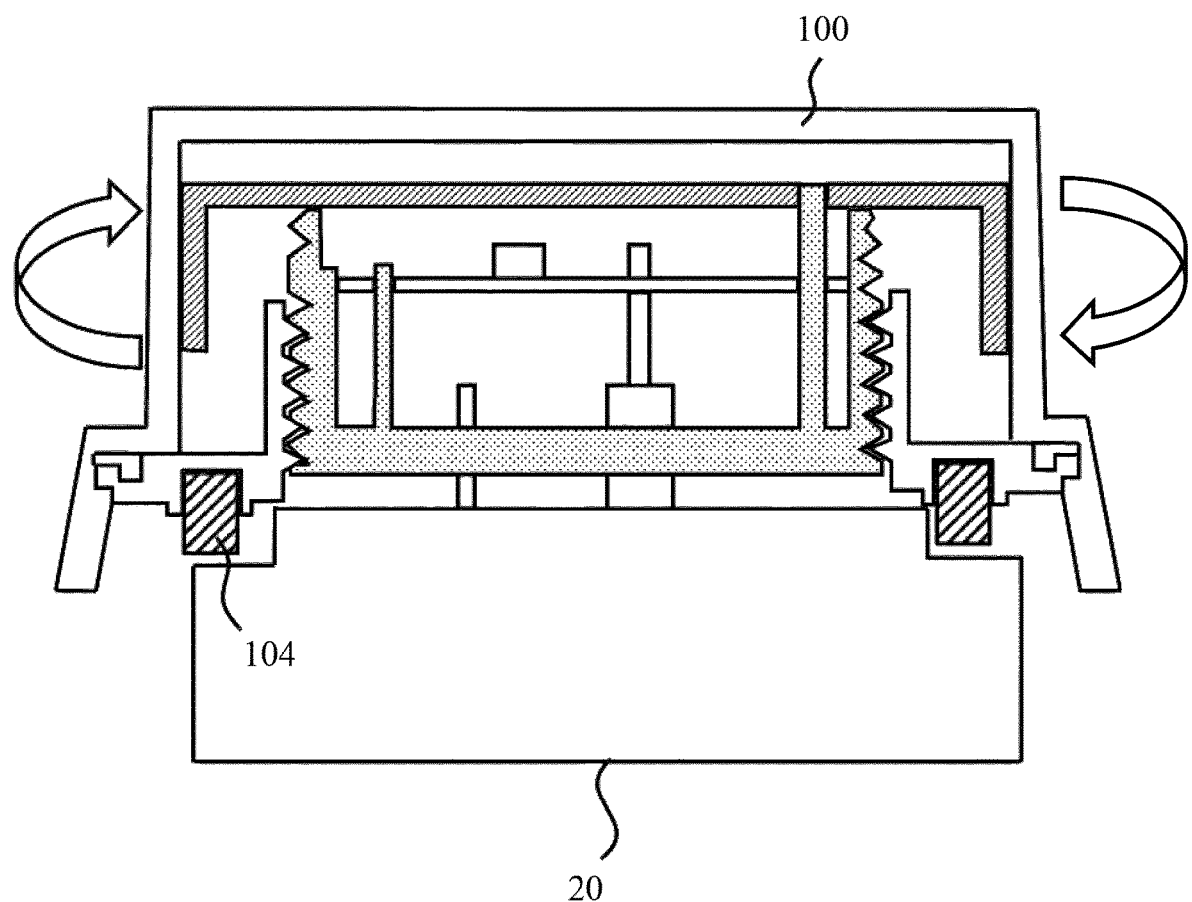
Figure 9C:
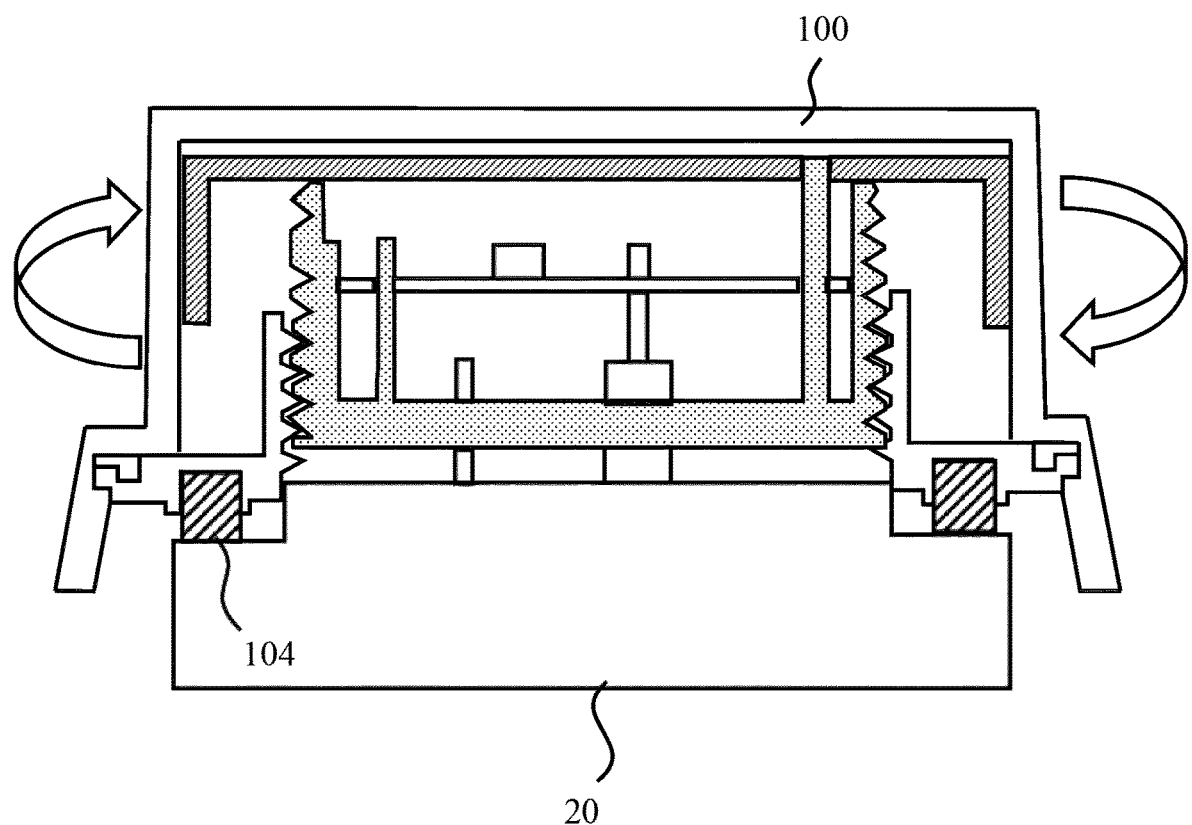

FIG. 9A-C schematically depicts a method of mounting the controller 100 according to embodiments of the present invention onto the socket 20 of any suitable outdoor electrical device 10, such as an outdoor luminaire, e.g. a street lamp or the like by way of non-limiting example. Prior to engaging the controller 100 with the socket 20, the installer sets the inner cover 110 and the outer cover 120 to their initial orientation in which upon engagement of the controller 100 with the socket 120 the annular compressible gasket 104 does not contact the upper surface 21 of the socket 20. The initial orientation may be set in any suitable manner, e.g. by upwardly rotating the outer body 120 to an end point of the snap fitting 140, by alignment of alignment markers on the inner body 110 and the outer body 120 and so on. The controller 100 also may be provided in this initial orientation between the inner body 110 and the outer body 120 by its manufacturer.

Next, as shown in step (A), the controller 100 is positioned on, e.g. lowered onto, the socket 20 such that the electrically conductive pins 102 are slotted into the respective pin reception regions 24 of the slots 22. This may further involve aligning the alignment marker 28 on the socket 20 with the alignment marker 138 on the inner cover 135 to ensure that the controller 100 is correctly positioned relative to the socket 20, e.g. in case of the control circuitry 132 comprising a light sensor or another light sensitive component as previously explained.

It is reiterated that at this point of the installation process the annular compressible gasket 104 does not significantly engage with the socket 20, to allow easy rotation or twisting of the controller 100 relative to the socket 20 by the installer in order to slot the electrically conductive pins 102 into the respective clamps 26 within the slots 22, as schematically depicted in step (B) of FIG. 9B. Due to the minimal friction between the inner body 110 and the outer body 120, the controller 100 can be rotated into this engaged position as a single unit, as the force required to overcome the friction associated with inserting or slotting the electrically conductive pins 102 into the respective clamps 26 typically is smaller than the force required to overcome the friction associated with rotating the outer body 120 relative to the inner body 110. Because the annular compressible gasket 104 does not need to be compressed at this stage, the installer can rotate the controller 100 into the socket 20 with relatively little effort, which is particularly beneficial where such an installation is to be performed at a considerable height where the working conditions for the installer may be awkward.

Upon the installer twisting the electrically conductive pins 102 into the respective clamps 26 within the slots 22, the controller 100 has reached an end point beyond which the controller 100 cannot be rotated any further relative to the socket 20, and in which the inner body 110 is secured in the socket 20 by way of the engagement between the electrically conductive pins 102 and the respective clamps 26 within the slots 22. Hence, at this stage, which is schematically depicted in step (C) of FIG. 9C, the installer continues to twist the controller 100 in the same direction as in step (B), e.g. a clockwise direction. The application of this continued twisting force causes the friction between the inner body 110 and the outer body 120 to be overcome, thereby causing the rotation of the outer body 120 relative to the inner body 110 towards the socket 20. The installer typically continues this twisting motion until the annular compressible gasket 104 is compressed against the socket 20, thereby forming the weatherproof seal between the controller 100 and the socket 20 of the outdoor electrical device 10. The friction between the inner body 110 and the outer body 120, e.g. caused by the presence of the snap fit 140, furthermore prevents upward rotation of the outer body 120 relative to the inner body 110 over time, thus preventing the failure of the weatherproof seal through such unwanted upward rotation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A controller for mounting onto a socket of an outdoor device, the controller comprising:
an inner body comprising a first bottom surface from which an annular arrangement of electrical connection pins for engaging with said socket extends, said inner body further housing control circuitry for said outdoor device, said control circuitry being electrically connected to at least some of said electrical connection pins; and
an outer body rotationally mounted around the inner body, the outer body comprising a further bottom surface around the first bottom surface and an outer cover extending from said further bottom plate covering the control circuitry, the further bottom surface carrying an annular compressible gasket for providing a weatherproof seal between the further bottom surface and the socket by rotational displacement of the outer body relative to the inner body, wherein in an initial orientation the further bottom surface is vertically displaced relative to the first bottom surface to such an extent that the annular compressible gasket does not touch the socket upon engagement of the controller with the socket and when the outer body relative to the inner body is rotated towards the socket the weatherproof seal is established between the outer body and the socket by compressing the annular compressible gasket against said socket.

2. The controller of claim 1, wherein the outer body is rotationally mounted around the inner body by engaged screw threads on the inner body and outer body respectively, said engaged screw threads exhibiting a friction exceeding a further friction to be overcome when rotating the electrical connection pins into a clamp arrangement within said socket.

3. The controller of claim 2, further comprising an inner cover mounted on the inner body covering the control circuitry and a snap fitting between the inner cover and the outer cover for introducing said friction between the inner body and the outer body.

4. The controller of claim 3, wherein said snap fitting comprises a plurality of serrated regions on one of an inner surface of the outer cover and the outer surface of the inner cover for engaging with respective protrusions on the other of the inner surface of the outer cover and the outer surface of the inner cover.

5. The controller of claim 3, wherein the control circuitry comprises a light sensor.

6. The controller of claim 5, wherein the outer cover is transparent, and the inner cover comprises at least a light transmissive region in a sidewall of the inner cover.

7. The controller of claim 6, wherein the inner cover is an opaque cover including said light transmissive region in said sidewall.

8. The controller of claim 6, wherein the inner cover further comprises an alignment marker in alignment with said light transmissive region on a top surface of the inner cover.

9. The controller of claim 1, further comprising a printed circuit board affixed to the inner body and carrying the control circuitry.

10. The controller of claim 1, wherein the annular compressible gasket is a sponge or rubber gasket.

11. The controller of claim 1, wherein the controller is ANSI 136.10/136.41 or BS5972 compliant.

12. An outdoor electrical device comprising the controller of claim 1 and the socket having an annular arrangement of slots, each slot having a pin reception region and an electrically conductive clamp that is rotationally offset relative to said pin reception region, wherein the controller is mounted in said socket such that each of said electrical connection pins is secured in one of said electrically conductive clamps, and the outer body of the controller is engaged with the socket such that the annular compressible gasket forms a weatherproof seal between the outer body and the socket.

13. The outdoor electrical device of claim 12, wherein the outdoor electrical device is an outdoor luminaire comprising a driver electrically coupled to the electrically conductive clamps and a light source under control of the driver, wherein the controller is arranged to control the driver.

14. A method of mounting the controller of claim 1 onto an outdoor electrical device comprising the socket having an annular arrangement of slots, each slot having a pin reception region and an electrically conductive clamp that is rotationally offset relative to said pin reception region, the method comprising:

positioning the outer body of the controller in an initial orientation relative to the inner body of the controller;

engaging the controller with the socket by:

slotting the electrically conductive pins of the controller into the annular arrangement of slots;

twisting the controller relative to the socket to slot the electrically conductive pins into the electrically conductive clamps whilst maintaining said initial orientation between the inner body and the outer body.

15. The method of claim 14, wherein twisting the controller relative to the socket to slot the electrically conductive pins into the electrically conductive clamps whilst maintaining said initial orientation requires a first twisting force, and rotating the outer body relative to the inner body towards the socket to establish a weatherproof seal between the outer body and the socket by compressing the annular compressible gasket against said socket requires a second twisting force exceeding the first twisting force.

* * * * *